No. 887,859. PATENTED MAY 19, 1908.
F. N. SMITH.
MIDDLE RING FOR PIPE COUPLINGS.
APPLICATION FILED JULY 1, 1907.

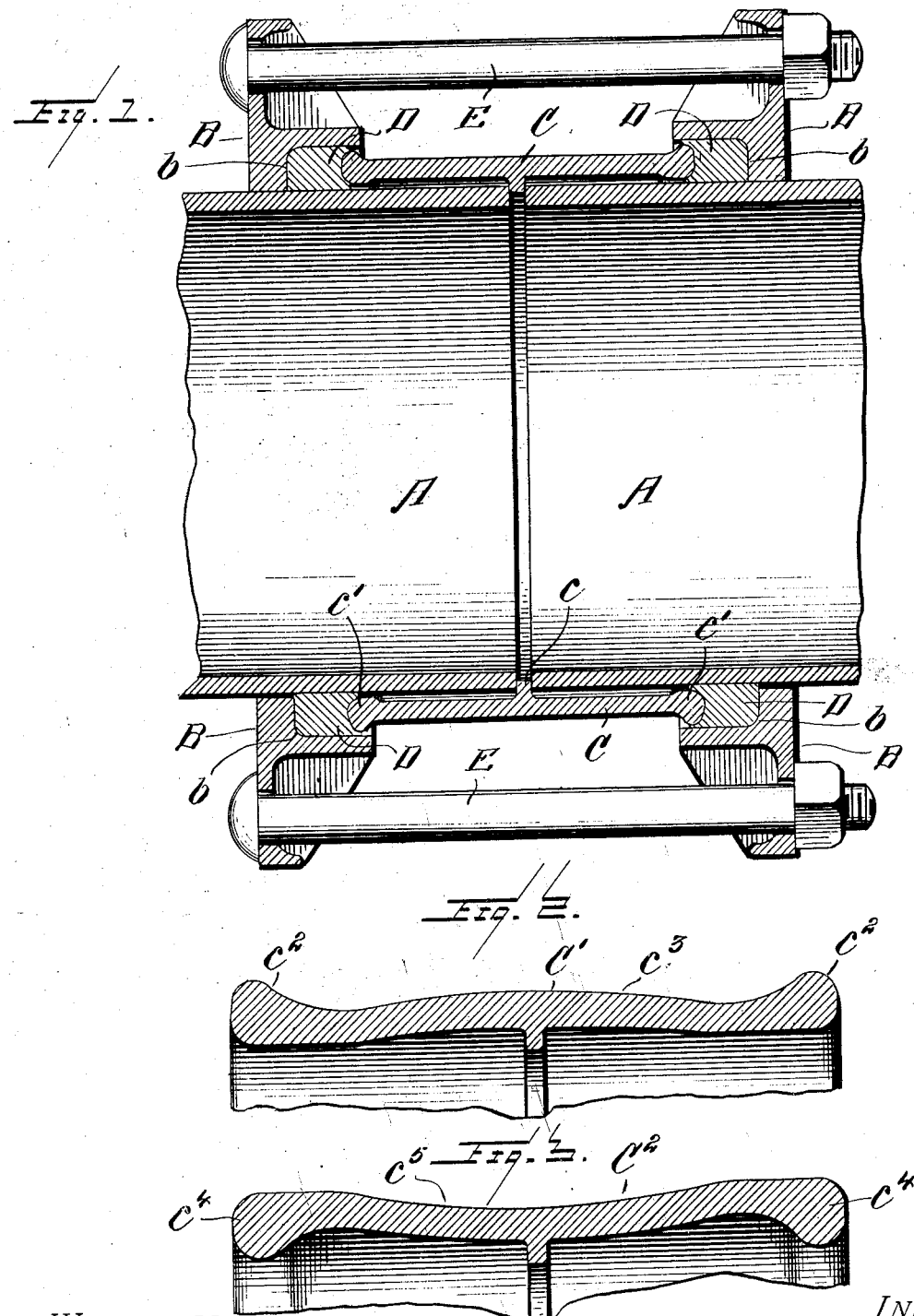

WITNESSES:
Wm F Foyle
J. K. Moore

INVENTOR
Frank N. Smith
BY
Whitaker Prevost Attorney

UNITED STATES PATENT OFFICE.

FRANK N. SMITH, OF BRADFORD, PENNSYLVANIA, ASSIGNOR TO S. R. DRESSER MANUFACTURING COMPANY, OF BRADFORD, PENNSYLVANIA.

MIDDLE RING FOR PIPE-COUPLINGS.

No. 887,859.

Specification of Letters Patent.

Patented May 19, 1908.

Application filed July 1, 1907. Serial No. 381,696.

*To all whom it may concern:*

Be it known that I, FRANK N. SMITH, citizen of the United States, residing at Bradford, in the county of McKean and State of Pennsylvania, have invented certain new and useful Improvements in Middle Rings for Pipe-Couplings; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying the invention and several slight modifications thereof and said invention is fully disclosed in the following description and claims.

My invention relates to that class of pipe couplings generally known in the trade as "rubber packed pipe couplings" which comprise a middle ring or coupling sleeve, two clamping rings having recesses to receive packings, annular packings or packing rings, located in said recesses and engaging the ends of the middle ring or coupling sleeve, and bolts connecting said clamping rings.

My invention consists in an improved middle ring or coupling sleeve for such couplings and consists in the novel features thereof which are hereinafter described.

Referring to the accompanying drawings, Figure 1 represents a sectional view of the meeting ends of two pipe sections and a coupling therefor of the kind described embodying my present invention. Fig. 2 is a partial sectional view of a slightly modified form of the middle ring or coupling sleeve shown in Fig. 1. Figs. 3 to 9 are similar views of other slightly modified forms of the middle ring or coupling sleeve.

In Fig. 1, A A represents the meeting ends of two pipe sections which it is desired to connect by a coupling, said pipe sections having plain or unthreaded end portions. B, B represent the clamping rings surrounding said pipe sections and provided with packing recesses $b$.

C represents my improved middle ring or sleeve surrounding the meeting portions of the pipes.

D, D represent the annular packings or packing rings lying in the packing recesses $b$ of the clamping rings and E, E represent bolts connecting the clamping rings for compressing the packing rings against the ends of the middle ring and expanding them laterally against the pipes and the outer walls of the packing recesses, to form a tight joint. In the manufacture of these middle rings or sleeves, it is desirable to make the main body thereof, of as thin material as is consistent with strength, and at the same time to have the packing engaging portions of considerable thickness, in order to offer a comparatively broad face to engage the packing to secure the proper compression of the same, without danger of cutting the packing, or of having it crowd out of the packing recesses, inside of or outside of the middle ring. To this end I form the main body, preferably of relatively thin material and thicken the end portions of the ring to provide packing engaging portions of much greater thickness than that of the intermediate portions of the ring. The middle rings made in accordance with my invention may be made of cast metal, if desired, but I prefer to make them of wrought metal, as wrought iron or steel.

In Fig. 1 the middle ring or sleeve C consists of a cylindrical body, having its interior face provided with a central annular flange or rib $c$ which is termed the centering stop, and which serves to center the coupling over the meeting ends of the pipes by limiting the distance to which each pipe section can be inserted into the sleeve or middle ring. The ring C is preferably made of wrought iron or steel as thin as can be used and yet provide the requisite strength and each end of the ring is thickened as by upsetting the wrought metal, as shown at $c'$ in the drawing Fig. 1, part of the excess thickness extending inwardly, and part outwardly, beyond the inner and outer faces of the central or intermediate portions of the ring. In this form of the ring the end portions are rounded where they engage the packing rings. The thickened or upset portions of the ring substantially fill the outer portions of the packing recesses, in the clamping rings and the packing rings will, therefore, be very evenly compressed and compacted in their recesses, against the pipes and the outer walls and ends of the recesses $b\ b$.

In Fig. 2 I have shown a section of a modified form of ring $c'$ similar to that shown in Fig. 1 in which the end portions are thickened so that the surplus metal is forced to project entirely beyond the outer face of the ring as shown at $c^2$ $c^2$, and the intermediate portions of the ring are bowed outwardly as at $c^3$ or in the same direction as the projecting lip formed by the surplus metal at the ends.

In Fig. 3, I have shown another modified form of ring $C^2$ similar to that shown in Fig. 1, except that the ends are thickened as at $c^4$ $c^4$ and the surplus metal caused to project entirely inwardly, and the intermediate portions of the ring are bowed inwardly as at $c^5$ or in the same direction as the projecting lip formed by the surplus metal at the ends.

I have found by experiment that the greatest strength to resist longitudinal strain on these rings can be obtained by forming the intermediate portions of the ring in a general line with the center of the projections formed by thickening or upsetting the end portions and I, therefore, form the intermediate portions of the wall of said ring straight when the surplus metal at the thickened end portions is evenly divided so as to project both inwardly and outwardly as shown in Fig. 1 while I preferably bow the intermediate portions of the ring outwardly if the surplus metal is disposed on the outer side as shown in Fig. 2 and inwardly if the surplus metal is disposed on the inside as shown in Fig. 3.

Figure 4:
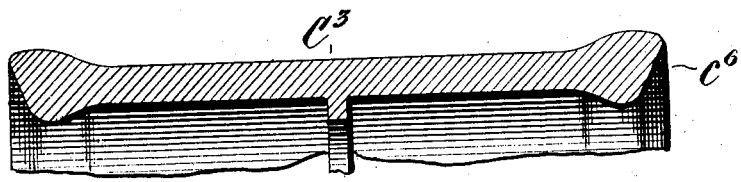
Fig. 4 represents a partial section of a middle ring $C^3$ having its ends thickened or upset, to provide an inclined backing engaging face $c^6$ to assist in compressing the packing against the exterior of the pipe sections, the surplus metal being equally distributed and the intermediate portions of the walls of the ring being straight.
Figure 5:
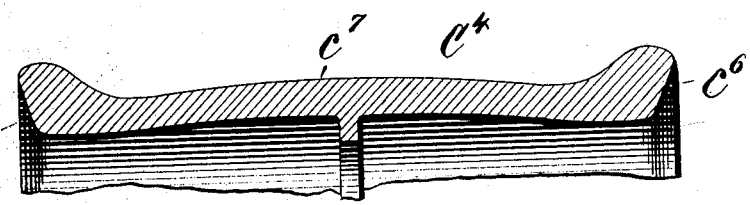
Fig. 5 is a similar view of a similar ring $C^4$ having the same inclined face, but in this case the surplus metal at its ends is disposed entirely on the outside of the ring and the intermediate portions are bowed outwardly as at $c^7$.
Figure 6:
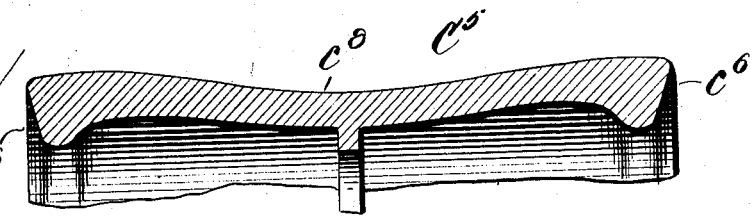
Fig. 6 shows a partial section of a ring similar to that shown in Figs. 4 and 5 but leaving the surplus metal at its ends disposed interiorly and the intermediate portions of the ring are bowed inwardly as at $c^8$.
Figure 7:
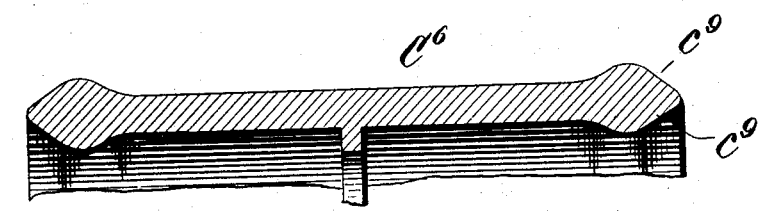
Figure 8:
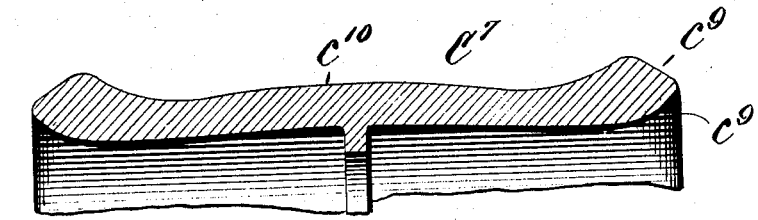
Figure 9:
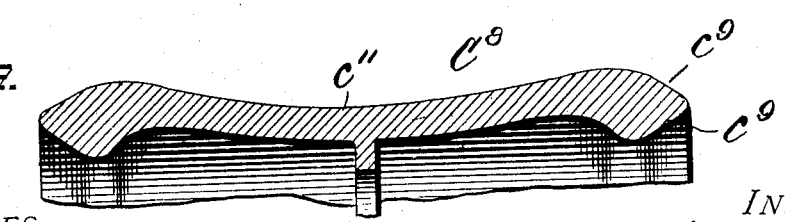

Figs. 7, 8 and 9 are views similar respectively to Figs. 4, 5 and 6 and illustrate middle rings $C^6$, $C^7$ and $C^8$ having the ends upset or thickened and provided with oppositely inclined packing engaging faces $c^9$ $c^9$ meeting at the extreme ends of the ring, and adapted to force the packing both inwardly and outwardly when the bolts of the coupling are tightened. In Fig. 7 the surplus metal at the ends is evenly distributed both inside and outside and the intermediate portions of the ring are straight. In Fig. 8, the surplus metal at the ends extends on the outside and the intermediate portions of the ring are bowed outwardly, as at $c^{10}$. In Fig. 9 the surplus metal at the ends of the rings is disposed on the inner side of the ring and the intermediate portions are bowed inwardly as at $c^4$.

While I have stated herein that the middle rings when made of wrought metal may have their end portions thickened by upsetting, I wish it to be understood that I do not limit myself to upsetting as the end portions of the rings may be thickened in other ways. For example, I may form these rings from a previously rolled or prepared skelp or plate of the desired cross section, which skelp is provided with thickened edge portions, and the rings may be formed by taking a piece of the skelp or plate having the previously formed thickened edge portions and bending the same into ring form and welding the ends together as will be readily understood. And in other ways I do not desire to be limited to the exact details of construction herein shown and described.

What I claim and desire to secure by Letters Patent is:—

1. A middle ring or coupling sleeve for pipe couplings having clamping rings and compressible packings, said ring having at each end packing engaging portions of greater thickness than intermediate portions, the surplus metal at the ends projecting to one side of the wall of the ring and the intermediate portions of the ring wall being bowed in a direction toward the side on which the said surplus metal projects, substantially as described.

2. A middle ring or coupling sleeve for pipe couplings having clamping rings and compressible packings, said ring having its end portions thickened to provide packing engaging portions of greater thickness than the intermediate portions of the ring, the said packing engaging portions having a face inclined to the axis of the ring, and having the surplus metal disposed entirely at one side of the ring wall, the intermediate portions of the ring wall being curved so as to present convex portions on the same side as the said projecting portions, substantially as described.

3. A middle ring or coupling sleeve for pipe couplings having clamping rings and compressible packings, said middle ring having its end portions thickened to provide packing engaging portions of greater thickness than the intermediate portions of the ring, said intermediate portions being disposed out of a straight line and having the center of its wall adjacent to the central part of the ring substantially in line longitudinally with the centers of said thickened end portions, substantially as described.

4. A middle ring or coupling sleeve for pipe couplings having clamping rings and compressible packings, said ring being composed of wrought metal having its end portions upset to provide thickened packing engaging portions, the intermediate portions of the ring being disposed substantially in line with the centers of said thickened portions, substantially as described.

5. A middle ring or coupling sleeve for pipe couplings having clamping rings and compressible packings, said ring being composed of wrought metal having its end portions thickened to provide packing engaging portions, the surplus metal projecting laterally to one side only, and the intermediate portions of the ring being bowed so as to bring them substantially in line with the centers of said thickened portions, substantially as described.

In testimony whereof I affix my signature, in the presence of two witnesses.

FRANK N. SMITH.

Witnesses:
F. P. SCHOONMAKER,
T. P. RYAN.